(12) United States Patent
Hara et al.

(10) Patent No.: US 6,398,366 B1
(45) Date of Patent: Jun. 4, 2002

(54) IMAGE DISPLAY APPARATUS OF THE PROJECTION TYPE

(75) Inventors: Nobuyuki Hara, Kanagawa; Takuji Ohkubo, Chiba, both of (JP)

(73) Assignee: Sony Corporation, Tokyo (JP)

(*) Notice: Subject to any disclaimer, the term of this patent is extended or adjusted under 35 U.S.C. 154(b) by 33 days.

(21) Appl. No.: 09/687,955

(22) Filed: Oct. 13, 2000

(30) Foreign Application Priority Data

Oct. 15, 1999 (JP) .......................................... 11-294387

(51) Int. Cl.$^7$ ........................ G03B 21/18; G03B 21/26; G03B 21/16; G03B 21/14; G03B 11/04
(52) U.S. Cl. .............................. 353/57; 353/31; 353/34; 353/37; 353/58; 353/60; 353/61; 353/87; 353/119; 359/511; 359/512
(58) Field of Search ............................. 353/57, 119, 87, 353/60, 61, 58, 52, 31, 33, 34, 37, 59; 359/511, 512

(56) References Cited

U.S. PATENT DOCUMENTS

| | | | | |
|---|---|---|---|---|
| 4,513,358 A | * | 4/1985 | Lemme | 362/276 |
| 4,563,067 A | * | 1/1986 | Ozeki | 353/60 |
| 6,254,238 B1 | * | 7/2001 | Takamatsu | 353/61 |
| 6,280,038 B1 | * | 8/2001 | Fuse et al. | 353/57 |
| 6,290,360 B1 | * | 9/2001 | Konuma et al. | 353/61 |

\* cited by examiner

Primary Examiner—Christopher Mahoney
Assistant Examiner—Magda Cruz
(74) Attorney, Agent, or Firm—Frommer Lawrence & Haug LLP; William S. Frommer

(57) ABSTRACT

A display apparatus of the projection type is improved in that, when a lamp valve breaks or is to be replaced, glass fragments and so forth thereof are prevented from being scattered into the inside of an outer housing of a projector apparatus through a cooling air intake port in a portion of the outer casing below the lamp valve and a comparatively small number of cooling fans are used to reduce the size and the weight of the overall display apparatus while optical modulation elements, a light source element and so forth can be forcibly cooled in a high efficiency. Cooling air blasted from an air blasting fan is blasted through an air blasting duct to three spatial optical modulation elements, a PS conversion element and a discharge lamp to forcibly air-cool the elements. A lamp box in which the light source is accommodated and which is removably mounted in an outer housing has a cooling air intake port through which cooling air is taken in to the light source. A shutter mechanism automatically opens the cooling air intake port when the lamp box is mounted in position into the outer housing, but automatically closes up the cooling air intake port when the lamp box is removed outwardly from the outer housing.

7 Claims, 10 Drawing Sheets

IMAGE DISPLAY APPARATUS OF THE PROJECTION TYPE

BACKGROUND OF THE INVENTION

This invention relates to a display apparatus of the projection type wherein an image obtained by irradiating light from a light source upon a light valve is projected on a screen or a like element, and more particularly to a display apparatus of the type which includes a forced air cooling apparatus which includes a cooling fan.

Conventionally, such an apparatus as shown in FIGS. 9 and 10 is known as a liquid crystal projector apparatus which is an example of a display apparatus of the projection type. Referring to FIGS. 9 and 10, the liquid crystal projector apparatus 1 shown includes an outer housing 2 formed in a flattened parallelepiped configuration from a metal sheet or the like. Four stands 3 at which the liquid crystal projector apparatus 1 is placed on a desk or the like are mounted at four corners of the bottom of the outer housing 2. An optical unit case 4 is mounted horizontally at an intermediate position in the vertical direction of the inside of the outer housing 2. The optical unit case 4 is formed in a flattened configuration from a metal sheet or the like and is bent such that it has a substantially L-shape in plane. An optical unit 5 for projecting a color image on a screen or the like is accommodated horizontally in the inside of the optical unit case 4.

The optical unit 5 includes a fly eye lens set 7 serving as illumination optical means and a PS conversion element 8 disposed in series on an optical axis P1 of a discharge lamp 6 serving as a light source. The optical axis P1 is bent by 90° into an optical axis P2 by means of a mirror 9, and two dichroic mirrors 10R and 10G for R (red) and G (green) serving as light decomposition means are disposed in series in a spaced relationship from each other and in an inclined relationship by 45° on the optical axis P2 bent from the optical axis P1. The dichroic mirrors 10R and 10G and a reflecting mirror 103 provide three optical axes P3, P4 and P5 all bent perpendicularly to the optical axis P2. Three condenser lenses 11R, 11G and 11B and three spatial optical modulation elements 12R, 12B and 12B for R, G and B (blue) such as transmission type liquid crystal panels or the like serving as optical modulation means are disposed on the optical axes P3, P4 and P5, respectively. A cross prism 13 of a square shape serving as optical synthesis means is disposed on an optical axis P6 of the three spatial optical modulation elements 12R, 12G and 12B. Further, a projection lens 14 is disposed on the outgoing side of the cross prism 13 so that image light outgoing from the three spatial optical modulation elements 12R, 12G and 12B for R, G and B such as transmission type liquid crystal display panels serving as optical modulation means is projected on a screen or the like.

The fly eye lens set 7 decomposes light L1 from the discharge lamp 6, which has an intensity distribution, into a large number of light spots. The large number of light spots are superposed on one another by spatial optical modulation elements to make uniform the brightness distribution of the illumination light upon the entire screen of the spatial optical modulation elements 12R, 12G and 12B. The PS conversion element 8 is composed of a plurality of polarizing beam splitters arranged in a rectangular configuration and a plurality of phase difference plates provided intermittently corresponding to the polarizing beam splitters, and converts the polarization direction of the light L1 from the discharge lamp 6 so that, for example, a P wave component of the light L1 may be converted into an S wave component. Consequently, the PS conversion element 8 outputs light which includes a comparatively great amount of an S wave component as a whole.

It is to be noted that the three condenser lenses 11R, 11G and 11B and the three spatial optical modulation elements 12R, 12G and 12B are disposed at three directional positions adjacent three faces of the square cross prism 13. Further, three polarizing plates 17R, 17G and 17B and three polarizing plates 18R, 18G and 18B are disposed on and in parallel to the incoming side and the outgoing side of the three spatial optical modulation elements 12R, 12G and 12B, respectively. In particular, the three polarizing plates 17R, 17G and 17B are adhered to faces on the incoming side of the three condenser lenses 11R, 11G and 11B while the three polarizing plates 18R, 18G and 18B are adhered to three faces on the incoming side of the cross prism 13.

Light from the discharge lamp 6 is uniformed by the fly eye lens set 7 and is converted into light having an adjusted polarization direction by the PS conversion element 8. Of the light L2 having the adjusted polarization direction, light components in the wavelength region of red are reflected by the dichroic mirror 10R and follow the path P3 until they are irradiated upon the spatial optical modulation elements 12R. Then, light components of the light L2 in the wavelength region of green are reflected by the dichroic mirror 10G and follow the path P4 until they are irradiated upon the spatial optical modulation element 12G. Finally, light components of the light L2 in the wavelength region of blue which have passed through the dichroic mirrors 10R and 10G are reflected by the reflecting mirror 103 and follow the path P5 until they are irradiated upon the spatial optical modulation element 12B.

The liquid crystal projector apparatus 1 is constructed in such a manner as described above, and the three spatial optical modulation elements 12R, 12G and 12G therein modulate the three color lights LR1, LG1 and LB1 with image signals corresponding to the three primary colors of red, green and blue applied thereto. In particular, the polarization planes of lights of predetermined polarization directions which have passed through the polarizing plates 17R, 17G and 17B are rotated by the spatial optical modulation elements 12R, 12G and 12B based on signals applied to the spatial optical modulation elements 12R, 12G and 12B. The predetermined polarization light components whose polarization planes have been rotated in this manner pass through the polarizing plates 18R, 18G and 18B and are introduced as image lights LR2, LG2 and LB2 into the cross prism 13. Then, the three image lights LR2, LG2 and LB2 are synthesized by the cross prism 13, and the synthesized image light L2 of R, G and B is emitted along the optical axis P6 by the projection lens 14 and projected on the screen (not shown) or the like so that a full-color image may be reflected on the screen or the like.

In this instance, the three polarizing plates 17R, 17G and 17B and the three polarizing plates 18R, 18G and 18B disposed in parallel on the incoming side and the outgoing side of the three spatial optical modulation elements 12R, 12G and 12B are incorporated in order to adjust the polarization directions of the three color lights LR1, LG1 and LB1 and the three image lights LR2, LG2 and LB2. Each of the three polarizing plates 17R, 17G and 17B and the three polarizing plates 18R, 18G and 18B is formed from a thin glass plate to which a polarizing film is adhered with a bonding agent. In the polarizing plates 17R, 17G and 17B and 18R, 18G and 18B, a temperature rise is caused by a polarizing action of the same. Therefore, a critical guarantee temperature (normally approximately 70° C.) for long term reliability is set for the polarizing plates 17R, 17G and 17B and 18R, 18G and 18B, and if the polarizing plates 17R, 17G and 17B and 18R, 18G and 17B are subject to a temperature higher than 70° C., then a seizure or a drop in light transmittance occurs with them. Accordingly, it is necessary to normally cool peripheral portions of the polarizing plates 17R, 17G and 17B and 18R, 18G and 18B.

The PS conversion element 8 is composed of a plurality of glass plates coated with a dielectric film and adhered to each other in a rectangular configuration with a bonding agent, and has a limit to the heat resisting use guarantee temperature of the bonding agent. If the temperature region of the bonding agent exceeds the guarantee temperature, then the transmittance of the light L1 through the bonding agent drops. Consequently, also it is necessary to cool the PS conversion element 8 so that the temperature region may not exceed the guarantee temperature. Further, an extra-high pressure mercury lamp is used most frequently for the discharge lamp 6 and includes a reflector in which a very high voltage lamp valve having an output power higher than 150 W is incorporated. Thus, if the temperature of associated elements around the lamp valve and the inside of the reflector should become higher than the limit temperature, then a devitrification phenomenon (drop of the light transmittance) of the lamp valve occurs. Therefore, also it is necessary to cool the associated elements around the lamp valve adjacent the discharge lamp 6 and the inside of the reflector.

Therefore, in the conventional liquid crystal projector apparatus 1 of the type described above, in order to cool the three polarizing plates 17R, 17G and 17B and the three polarizing plates 18R, 18G and 18B incorporated on the incoming side and the outgoing side of the three spatial optical modulation elements 12R, 12G and 12B, an air blasting fan 21 in the form of a thin axial flow fan is incorporated horizontally in an upwardly directed state at a lower portion of the optical unit case 4 in the outer housing 2 at a position just below the cross prism 13 such that cooling air blasted vertically upwardly from the air blasting fan 21 is blasted vertically upwardly into the optical unit case 4 through three cooling air forwarding ports 22R, 22G and 22B formed in a lower portion 4a of the optical unit case 4 at positions below the three spatial optical modulation elements 12R, 12G and 12B, respectively. Further, the cooling air is exhausted to the outside of the optical unit case 4 through three cooling air exhaust ports 23R, 23G and 23B formed in an upper portion 4b of the optical unit case 4 at positions above the three spatial optical modulation elements 12R, 12G and 12B so that the three polarizing plates 17R, 17G and 17B and the three polarizing plates 18R, 18G and 18B are air-cooled forcibly. Also at a position of the lower portion 4a of the optical unit case 4 just below the PS conversion element 8, an air blasting fan 24 of a small size is disposed such that the PS conversion element 8 is air-cooled forcibly by cooling air blasted vertically upwardly by the air blasting fan 24 similarly. A ventilating fan 25 is disposed in the proximity of the discharge lamp 6 on the inner back face of the outer housing 2 outside the optical unit case 4 such that, when the ventilating fan 25 operates, the discharge lamp 6 and associated elements therearound are air-cooled forcibly by a ventilation system wherein cooling air is sucked into the optical unit case 4 through a cooling air inlet port opened in the lower portion of the optical unit case 4 and then discharged to the outside of the optical unit case 4 through the inside of the reflector of the discharge lamp 6 and the associated elements around the lamp valve until it is discharged to the outside of the outer housing 2.

However, the structure wherein the three polarizing plates 17R, 17G, 17B and the three polarizing plates 18R, 18G and 18B, the PS conversion element 8 and the discharge lamp 6 are forcibly air-cooled independently of each other by the three air blasting fans 21, 24 and 25 which are independent of each other, respectively, is great in number of fans used and hence requires a high cost. Further, the structure makes the entire liquid crystal projector apparatus 1 great in size and heavy in weight and besides provides high noise when the three air blasting fans 21, 24 and 25 operate simultaneously. Further, although the conventional discharge lamp 6 has a protective glass plate applied to the front face thereof, since it is accommodated in the optical unit case 4, if the lamp valve should break, then glass fragments of the lamp valve and so forth are scattered over a wide range in the optical unit case 4 and are liable to have a bad influence on the optical elements 7 to 18 of the optical unit 5. Furthermore, since the cooling air intake port necessary for forced air cooling of the ventilation system by the ventilating fan 25 remains open in the lower portion of the optical unit case 4 at the position below the optical unit case 4, when the lamp valve breaks and is to be exchanged, there is the possibility that glass fragments and so forth of it may possibly be scattered also into the inside of the outer housing 2 of the liquid crystal projector apparatus 1 through the cooling air intake port in the lower portion of the optical unit case 4.

SUMMARY OF THE INVENTION

It is an object of the present invention to provide a display apparatus of the projection type wherein, when a lamp valve breaks or is to be replaced, glass fragments and so forth of the lamp valve are prevented from being scattered into the inside of an outer housing of a projector apparatus through a cooling air intake port in a portion of the outer casing below the lamp valve.

It is another object of the present invention to provide a display apparatus of the projection type which uses a comparatively small number of cooling fans to form the overall display apparatus in a comparatively small size and with a comparatively light weight and can forcibly cool optical modulation elements, a light source element and so forth in a high efficiency.

In order to attain the objects described above, according to the present invention, there is provided a display apparatus of the projection type, comprising an optical unit including a light source and optical modulation means for modulating light outputted from the light source with an image signal inputted thereto, cooling means including an air blasting fan for blasting cooling air blasted from the air blasting fan at least to the light source to cool the light source, an outer housing in which the optical unit and the cooling means are incorporated, and a lamp box removably mounted in the outer housing and having the light source accommodated therein, the lamp box including a transparent protective member disposed adjacent a light output port of the light source, the lamp box having a cooling air intake port for taking in cooling air from the cooling means to the light source, the lamp box further including automatic opening/closing means provided adjacent the cooling air intake port for automatically opening the cooling air intake port when the lamp box is mounted into the outer housing but automatically closing the cooling air intake port when the lamp box is removed to the outside of the outer housing.

The automatic opening/closing means provided adjacent the cooling air intake port automatically closes the cooling air intake port when the lamp box is removed to the outside of the outer housing. Consequently, when a lamp valve breaks and is to be replaced, fragments of glass of the lamp valve and so forth are prevented from being scattered into the inside of the outer housing of the projector apparatus through the cooling air intake port in the lower portion of the lamp box.

The display apparatus of the projection type may be constructed such that the cooling air intake port is provided at a lower portion of the lamp box, and the automatic opening/closing means provided adjacent the cooling air intake port is provided at a position spaced by a greater distance from the light source than the protective member in a direction of an optical axis of the light source.

When the lamp valve breaks, fragments of it are stopped by the protective member and drop to the lower portion of the lamp box. However, since the automatic opening/closing means provided adjacent the cooling air intake port is provided at a position spaced by a greater distance from the light source than the protective member in the direction of the optical axis of the light source, the scattering of the fragments can be confined to a range to the protective member disposed adjacent the light output port of the light source. Accordingly, the lamp box can be replaced with the fragments accommodated with certainty therein.

The display apparatus of the projection type may be constructed otherwise such that the cooling means includes an air blasting duct for blasting cooling air blasted from the air blasting fan at least to the light source to cool the light source, and the cooling air intake port of the lamp box is removably associated with the air blasting duct with the automatic opening/closing means interposed therebetween.

Even if, when the lamp valve breaks, a fragment of it should be scattered to the outside through the automatic opening/closing means, since the cooling air intake port is removably associated with the air blasting duct with the automatic opening/closing means interposed therebetween, the fragment remains within the air blasting duct and does not have a bad influence on the optical elements of the optical unit.

Preferably, the air blasting duct further blasts cooling air to the optical modulation means. Thus, since cooling air blasted from the single air blasting fan is blasted to at least two locations of the optical modulation means and the light source by the air blasting duct, the at least two locations of the optical modulation means and the light source can be forcibly air-cooled simultaneously in a high efficiency by the single air blasting fan.

The display apparatus of the projection type may be constructed such that the optical unit includes light decomposition means for decomposing light outputted from the light source into color lights of different wavelength bands, a plurality of optical modulation elements which serve as the optical modulation means and upon which the color lights decomposed by the light decomposition means are irradiated, and light synthesis means for synthesizing the color lights modulated by the optical modulation means into image light, and the air blasting duct includes air amount control means for controlling an amount of air to be blasted to the plurality of optical modulation elements. With the display apparatus of the projection type, the amount of air to be blasted to cool the plurality of optical modulation elements suitably can be controlled.

Preferably, the optical unit includes polarizing conversion means for converting light outputted from the light source into light of a predetermined polarization direction, and the air blasting duct further blasts cooling air to the polarizing conversion means. With the display apparatus of the projection type, the at least two locations of the light source and the polarizing conversion means can be forcibly air-cooled simultaneously with a high efficiency.

Preferably, the display apparatus of the projection type is formed from an air blasting duct for blasting the cooled air sent from the air blasting fan at least to the light source and cooling it and a sirocco fan is used for the air blasting fan. Since a sirocco fan which has a high static pressure is used, the plurality of cooling objects which are positioned in a spaced relationship from each other with the air blasting duct interposed therebetween can be cooled efficiently. Further, since the cooling air intake port of the lamp box is removably associated with the air blasting duct with the automatic opening/closing means interposed therebetween, when the lamp valve breaks, the scattering of fractions of the lamp valve is confined at least to the inside of the air blasting duct, and when the lamp box is to be replaced, it can be removed safely with almost all of the fragments left in the lamp box.

BRIEF DESCRIPTION OF THE DRAWINGS

These and other objects and features of the present invention will become clear from the following description of the preferred embodiment given with reference to the accompanying drawings, in which.

DETAIL DESCRIPTION OF THE PREFERRED EMBODIMENT

Figure 9:
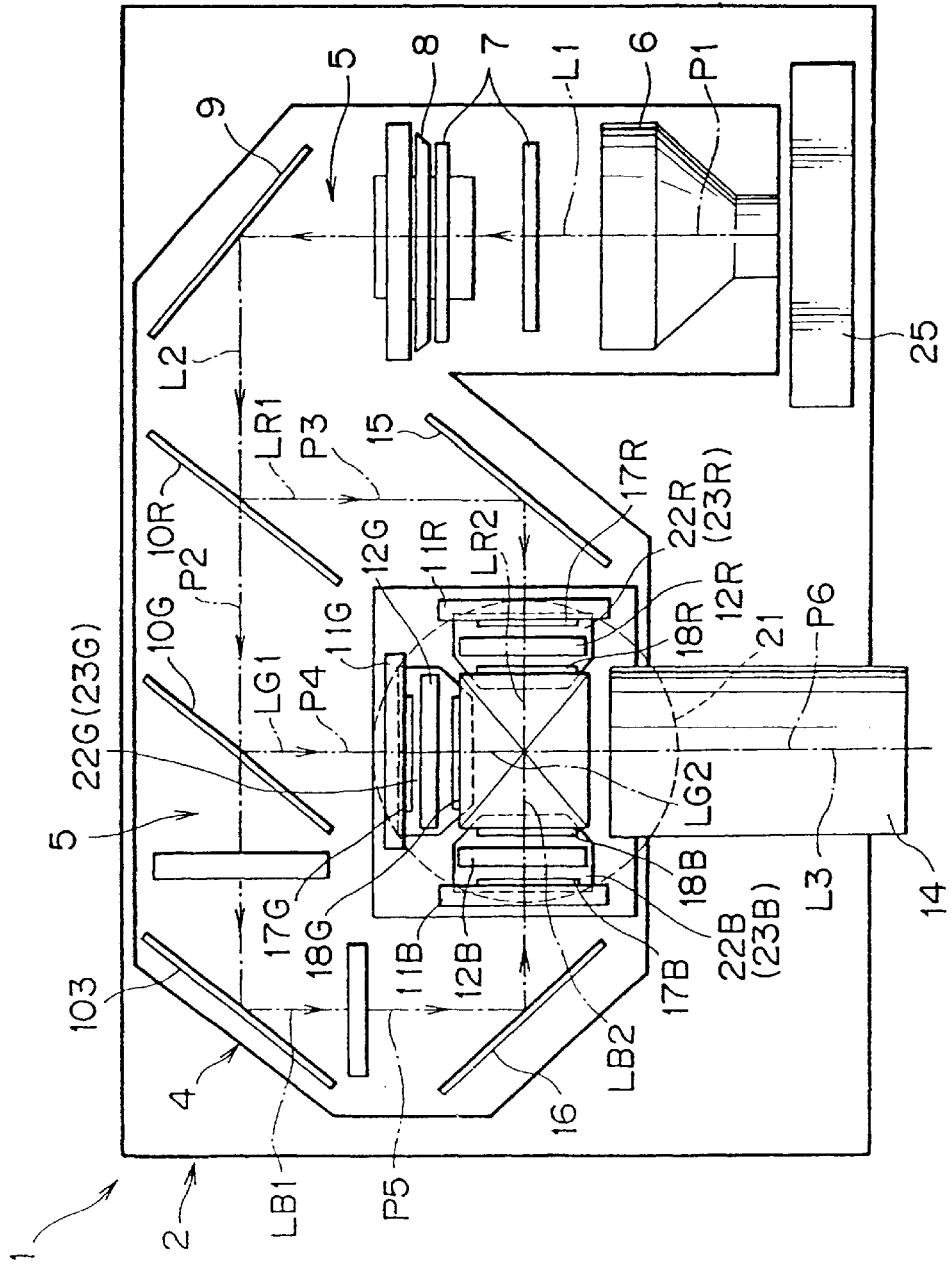
FIG. 9 is a schematic top plan view showing a conventional liquid crystal projector apparatus.
Figure 10:
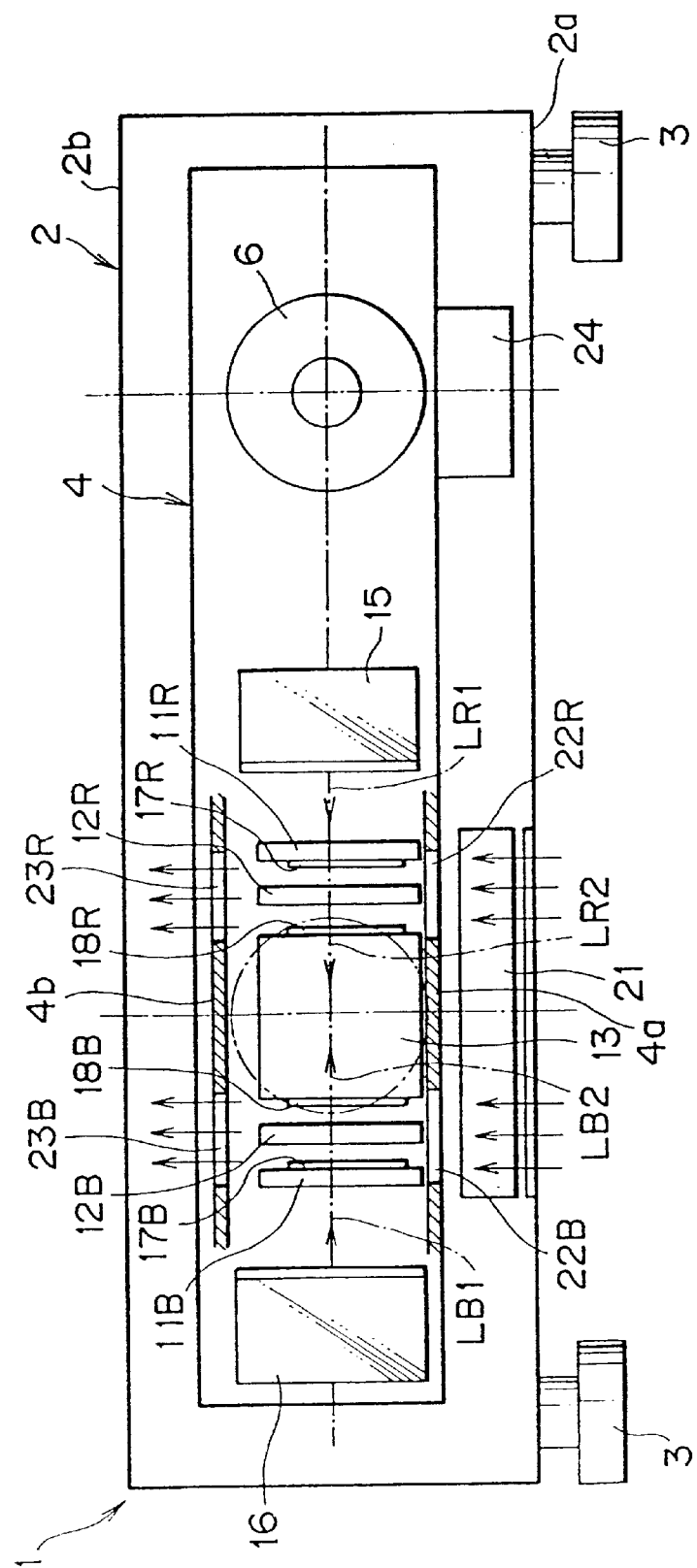
FIG. 10 is a schematic side elevational view of the conventional liquid crystal projector apparatus of FIG. 9.

In the following, an embodiment wherein a display apparatus of the projection type of the present invention is applied to a liquid crystal projector apparatus is described with reference to FIGS. 1 to 8. It is to be noted that like elements to those of the liquid crystal projector apparatus shown in FIGS. 9 and 10 are denoted by like reference characters and overlapping description of them is omitted herein to avoid redundancy.

First, referring to FIGS. 1 to 5, the liquid crystal projector apparatus 1 to which the present invention is applied includes a forced air cooling apparatus 31 which can forcibly air-cool three polarizing plates 17R, 17G and 17B and three polarizing plates 18R, 18G and 18B incorporated on the incoming side and the outgoing side of three spatial optical modulation elements 12R, 12G and 12G serving as optical modulation means, respectively, a PS conversion element 8 incorporated in a fly eye lens set 7 serving as illumination optical means and a discharge lamp 6 serving as a light source efficiently by means of a minimum number of cooling fans.

In the forced air cooling apparatus 31, optical elements 7 to 18 in an optical unit 5 are accommodated in an optical unit case 4, and the discharge lamp 6 serving as a light source is accommodated in a lamp box 41 separate from the optical unit case 4. The forced air cooling apparatus 31 employs two cooling fans including an air blasting fan 32 which has been developed newly and a conventionally existing ventilating fan 25. Particularly for the air blasting fan 32, a sirocco fan of a multi-blade structure which provides a high static pressure is used in order to increase the amount of cooling air. The air blasting fan 32 is incorporated horizontally in a transversely directed state at a position in a lower portion of the optical unit case 4 in an outer housing 2 substantially just below the projection lens 14, and a cooling air intake port 32a of the air blasting fan 32 is opened to a lower portion 2a of the outer housing 2 while a cooling air discharge port 32b is opened in a transversely directed state at another position just below the cross prism 13.

An air blasting duct 33 is mounted horizontally at a lower portion 4a of the optical unit case 4. The air blasting duct 33 is formed in a substantially channel-shaped configuration in plan as a whole and includes an air blasting start end portion 33a provided at one end thereof and formed in a substantially square shape or the like, an air blasting intermediate portion 33b of a rather small cross section extending sidewardly from the air blasting start end portion 33a, and an air blasting last end portion 33c provided at the other end of the air blasting duct 33 and extending substantially perpendicularly or the like in a horizontal direction from a free end portion of the air blasting intermediate portion 33b. The air blasting start end portion 33a is formed in a substantially channel shape with the top opened while the air blasting intermediate portion 33b and the air blasting last end portion 33c are formed each as a flattened angular tube. The air blasting intermediate portion 33b of the air blasting duct 33 is disposed substantially in parallel to an optical axis P2 along which the two dichroic mirrors 10R and 10G of the optical unit 5 in the optical unit case 4 are disposed, and the air blasting start end portion 33a is disposed at a position just below the cross prism 13 while the air blasting last end portion 33c at the other end is disposed substantially in parallel to an optical axis P1 along which the discharge lamp 6 and the fly eye lens set 7 in the optical unit case 4 are disposed. The air blasting start end portion 33a has a comparatively great thickness while the air blasting intermediate portion 33b and the air blasting last end portion 33c have a comparatively small thickness, and the air blasting intermediate portion 33b and the air blasting last end portion 33c are connected in an upwardly displaced state to the air blasting start end portion 33a. It is to be noted that, although the air blasting duct 33 may be formed as a unitary member composed of three structural portions of the air blasting start end portion 33a, air blasting intermediate portion 33b and air blasting last end portion 33c and mounted on the lower portion 4a of the optical unit case 4, for example, the air blasting start end portion 33a may be cut away from the air blasting intermediate portion 33b and formed integrally with the lower portion 4a of the optical unit case 4.

One side face of the air blasting start end portion 33a of the air blasting duct 33 is connected to the cooling air discharge port 32b of the air blasting fan 32, and the upper open portion of the air blasting start end portion 33a is connected to three cooling air forwarding ports 22R, 22G and 22G formed in the lower portion 4a of the optical unit case 4 at positions below the three spatial optical modulation elements 12R, 12G and 12G. An air amount adjustment plate 34 is disposed vertically at a position displaced upwardly in the air blasting start end portion 33a. The air amount adjustment plate 34 is disposed at a substantially equal height position as the open end of the air blasting intermediate portion 33b in a state inclined to substantially 45° with respect to the cooling air intake port 32a of the air blasting fan 32. The air amount adjustment plate 34 is mounted for angular adjustment in the direction of an arrow mark a, which is a horizontal direction, by a vertically extending pivot shaft 35, and a gap 36 is formed between the lower end of the air amount adjustment plate 34 and the lower end of the air blasting start end portion 33a. An inclined portion 37 which is inclined to substantially 45° is formed on a side face of the air blasting start end portion 33a remote from the cooling air discharge port 32b.

In order for the apparatus to perform optimum air blasting control as a whole, an air amount control plate 3d for controlling the blasted air amount of cooling air to be blasted to the discharge lamp 6 is mounted at the air blasting intermediate portion 33b of the air blasting duct 33. The air amount control plate 3d is provided for sliding adjustment in the direction of an arrow mark which is a direction perpendicular to the air blasting direction in response to a slide switch (not shown).

In the liquid crystal projector apparatus 1 having the construction described above, since cooling air blasted from the single air blasting fan is blasted to at least two locations of the optical modulation means and the light source through the air blasting duct so that the at least two locations of the optical modulation means and the light source can be forcibly air-cooled simultaneously with a high efficiency by the single air blasting fan, reduction in size, weight and cost of the overall display apparatus of the projection type can be achieved while at least the optical modulation means and the light source can be forcibly air-cooled in a high efficiency. Accordingly, a display apparatus of the projection type which achieves both of reduction in size and weight and augmentation in long term reliability and is high in quality can be realized.

Further, a cooling air delivery port 38 open to the top of the air blasting last end portion 33c of the air blasting duct 33 is opened in the lower portion 4a of the optical unit case 4 at a position below the PS conversion element 8 incorporated in the fly eye lens set 7, and another cooling air delivery port 39 which is opened to a terminal end of the air blasting last end portion 33c is connected in such a manner as hereinafter described to the discharge lamp 6. A dust preventive filter 40 is removably mounted at the cooling air intake port 32a of the air blasting fan 32.

Thus, cooling air blasted from the single air blasting fan is blasted to three locations of the polarizing plates, the light source and the PS conversion element through the blasting duct so that the three locations of the polarizing plates, the PS conversion element and the light source are forcibly air-cooled simultaneously with a high efficiency.

Consequently, while reduction in size, weight and cost of the entire display apparatus of the projection type is achieved, the three locations of the polarizing plates, the PS conversion element and the light source can be forcibly air-cooled with a high efficiency. Accordingly, a display apparatus of the projection type which achieves both of reduction in size and weight and augmentation in long term reliability and is high in quality can be realized.

Figure 1:
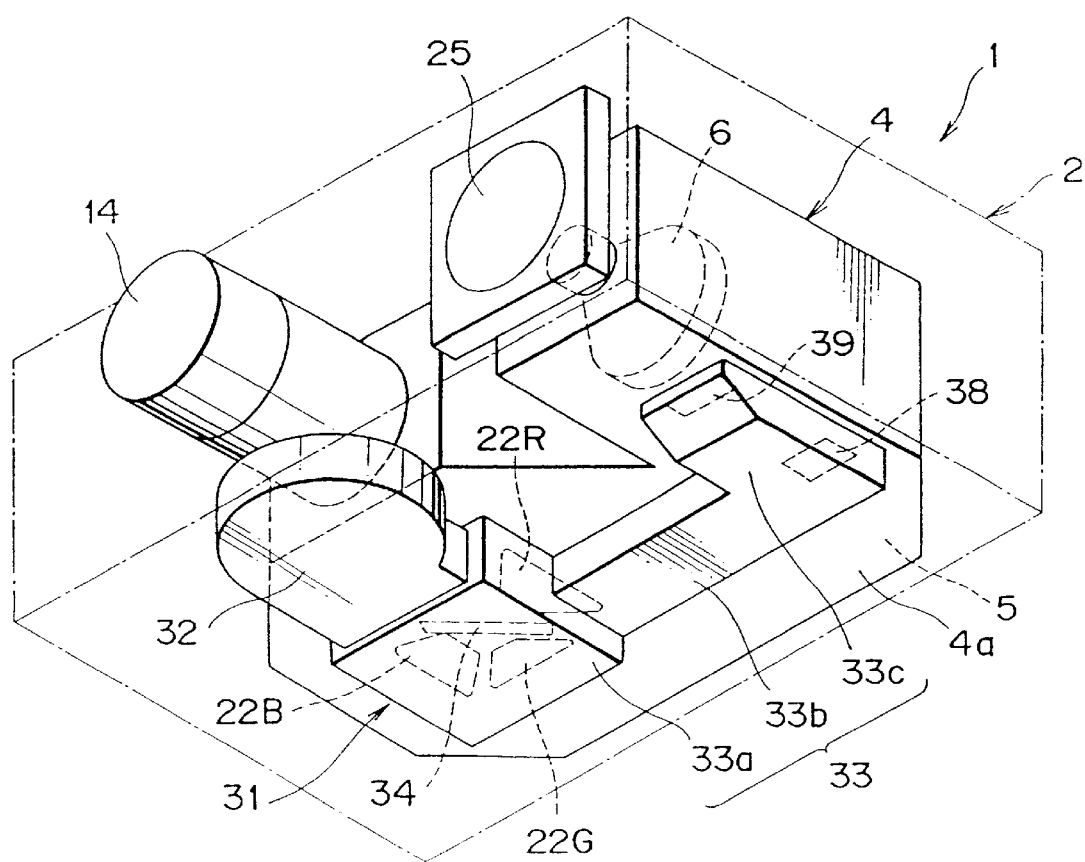
FIG. 1 is a perspective view as viewed from below showing a general construction of a forced air cooling apparatus for a liquid crystal projector apparatus to which the present invention is applied.
Figure 2:
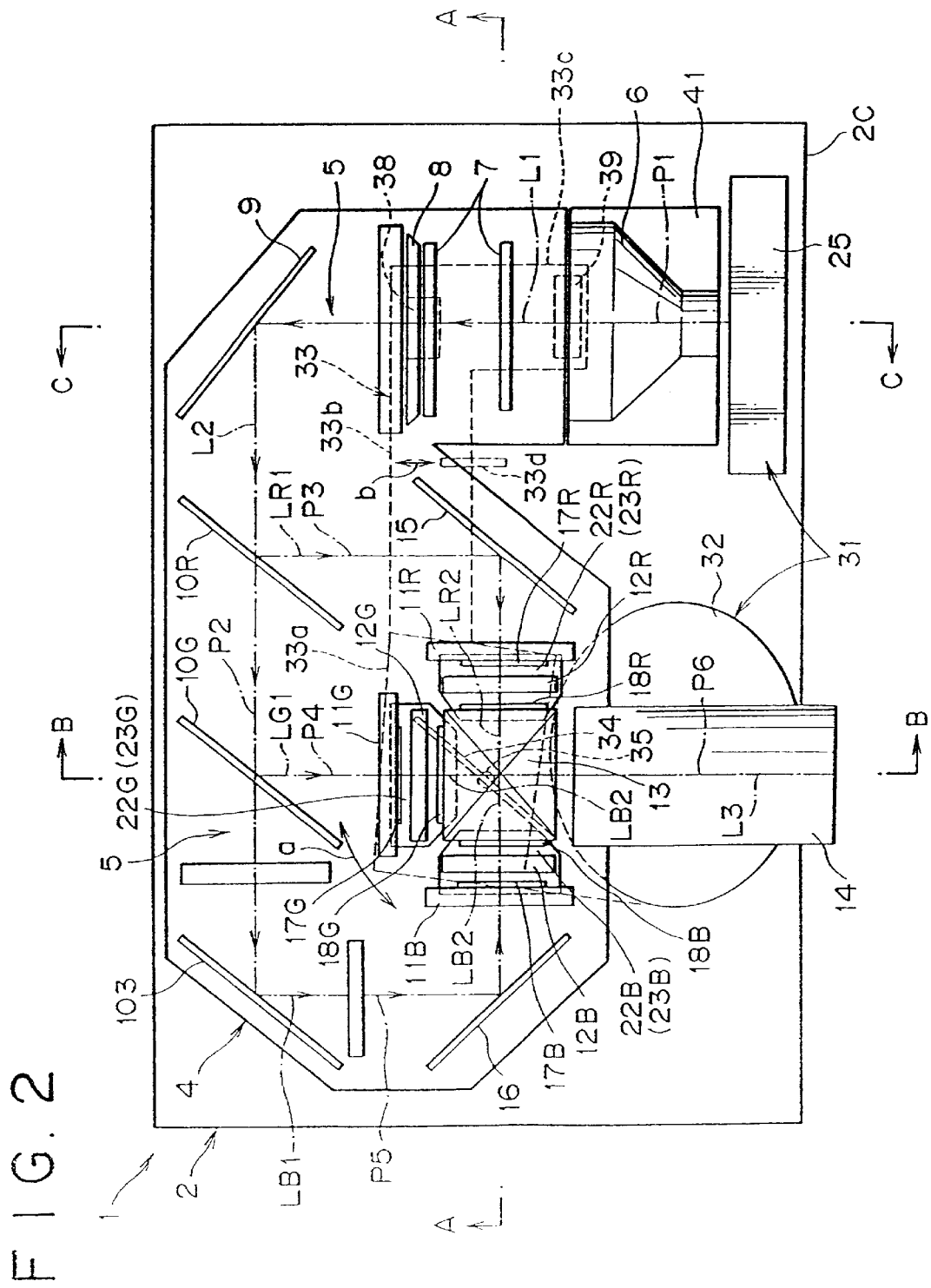
FIG. 2 is a schematic top plan view of the liquid crystal projector apparatus of FIG. 1.
Figure 3:
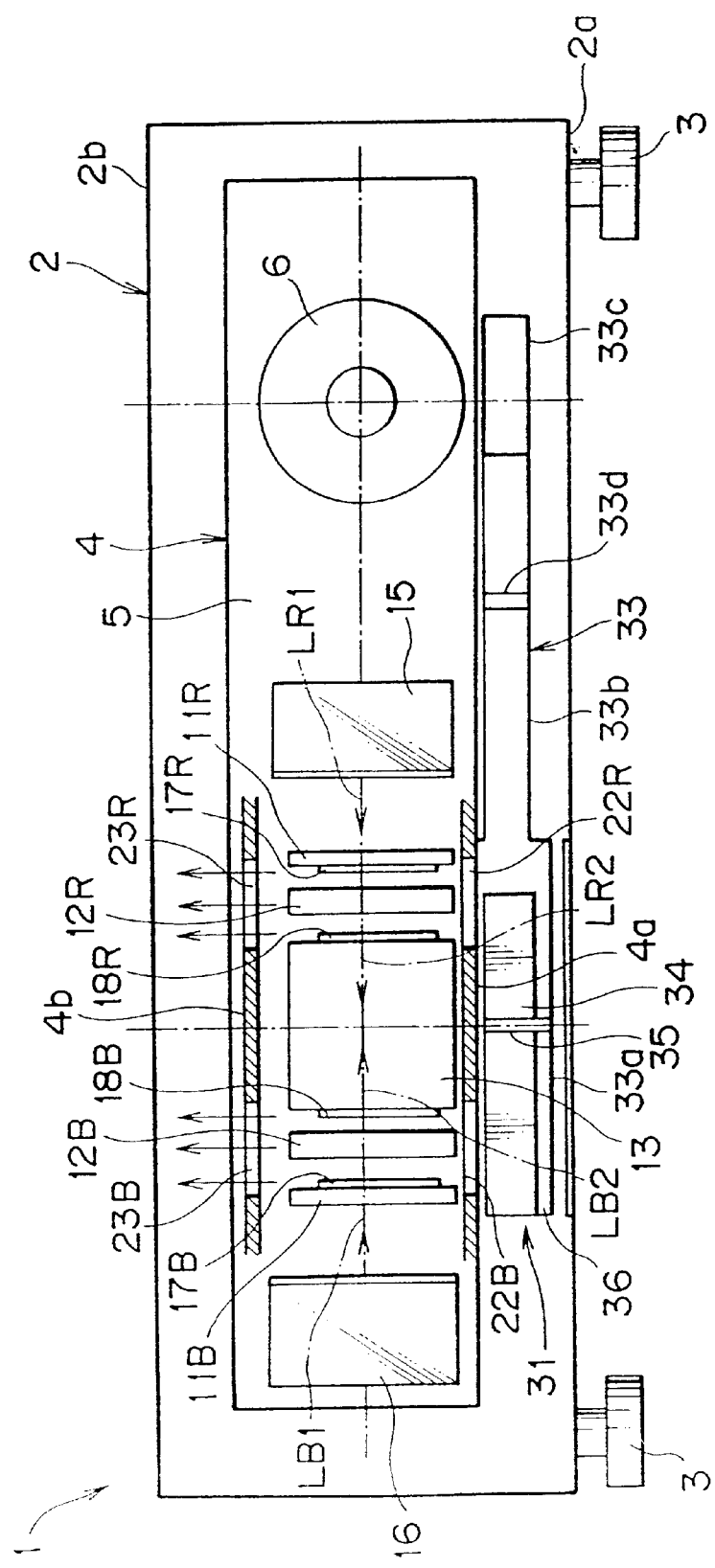
FIG. 3 is a schematic side elevational sectional view taken along line A—A of FIG. 2.
Figure 4:
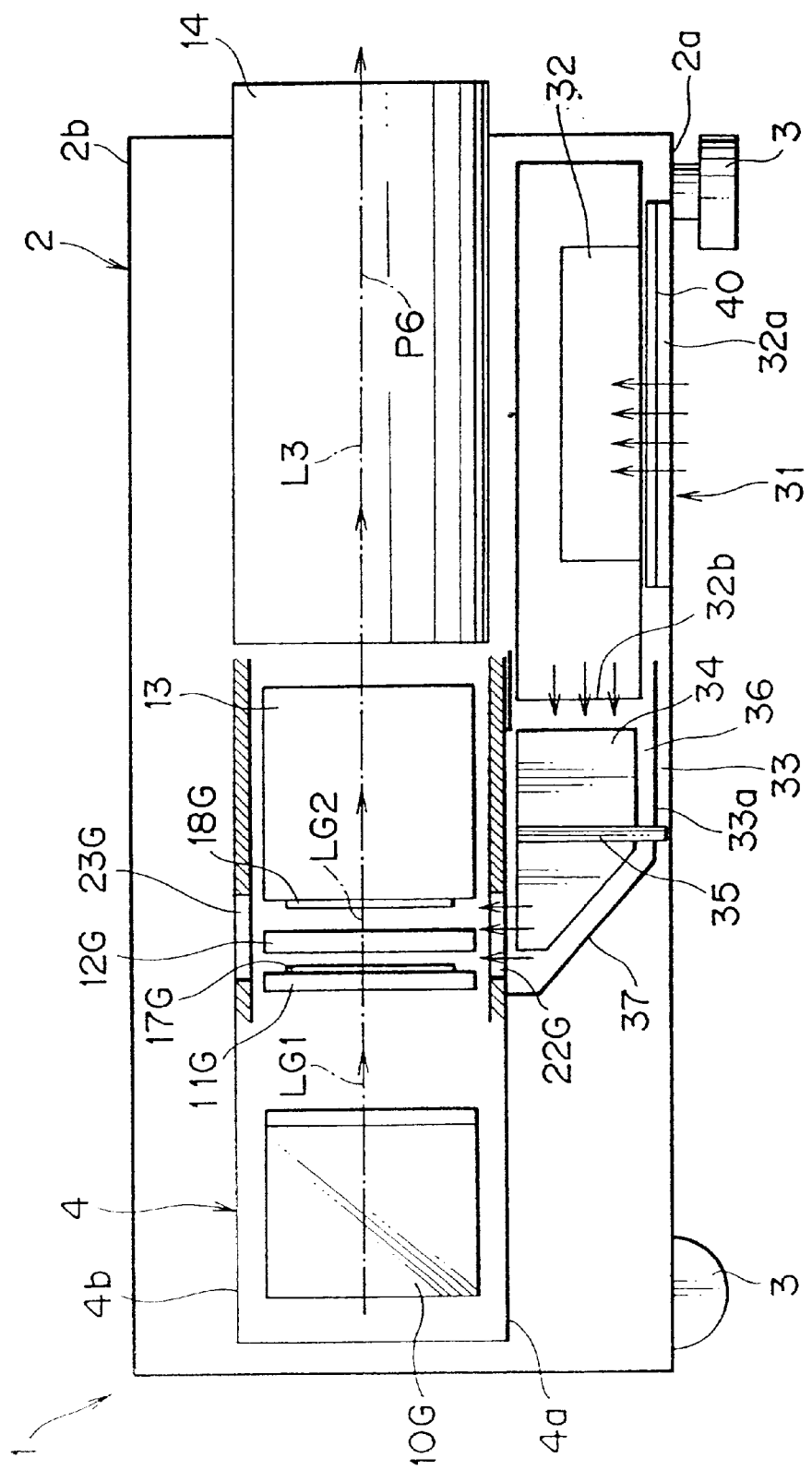
FIG. 4 is a schematic side elevational sectional view taken along line B—B of FIG. 2.
Figure 5:
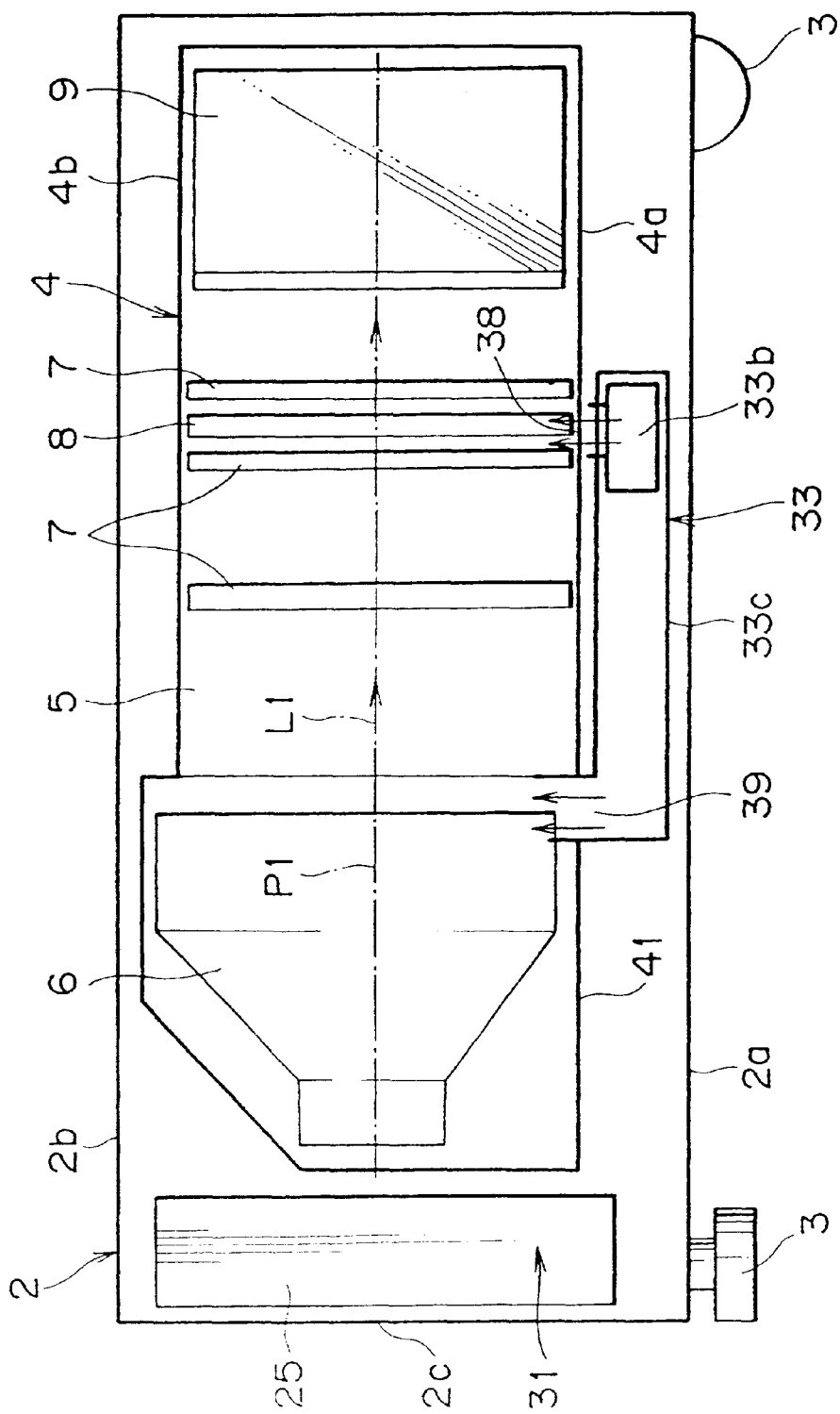
FIG. 5 is a schematic side elevational sectional view taken along line C—C of FIG. 2.
Figure 6:
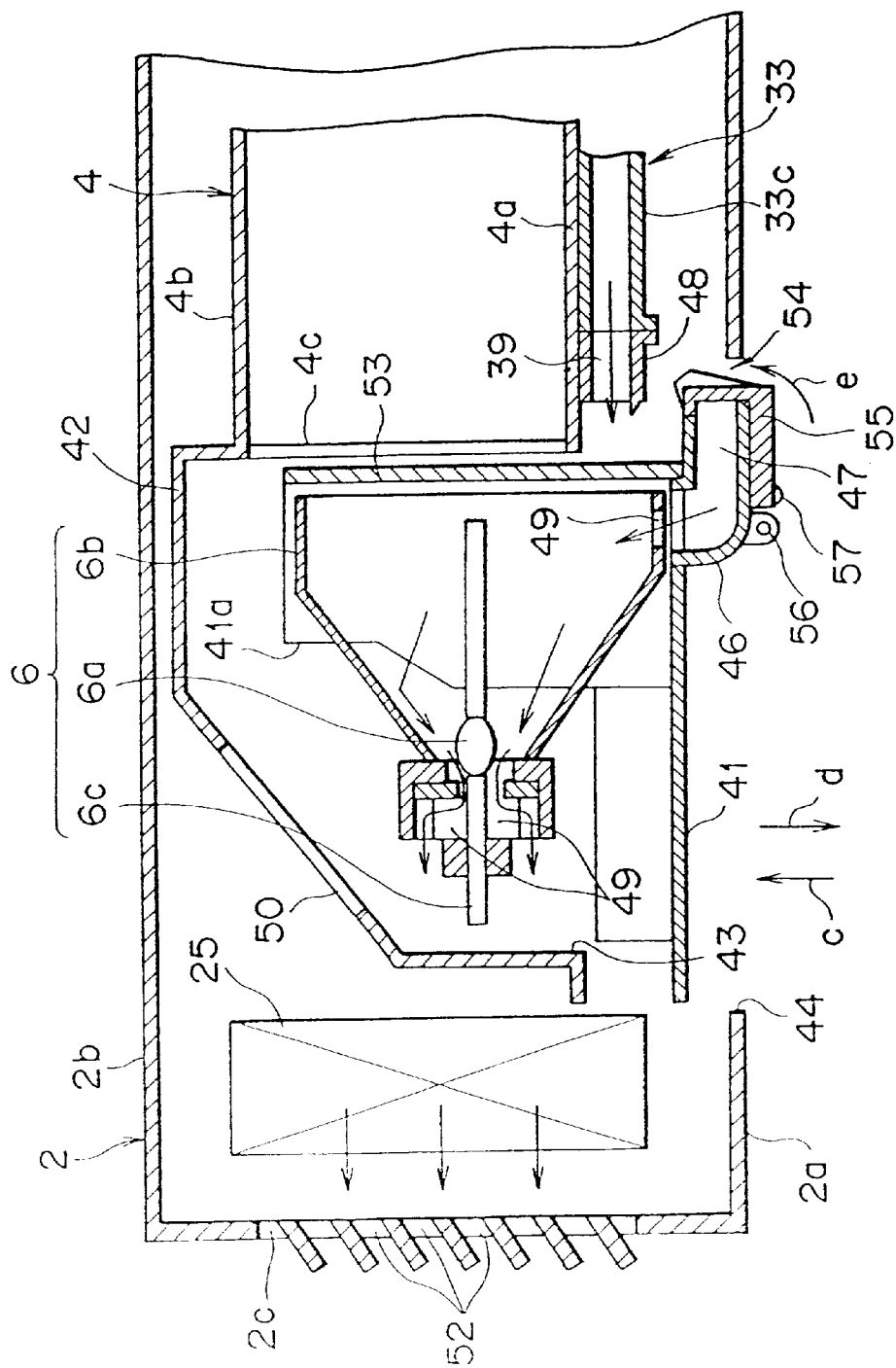
FIG. 6 is a longitudinal sectional side elevational view showing the lamp box of the liquid crystal projector apparatus of FIG. 1 when the lamp box is removed or mounted.
Figure 7:
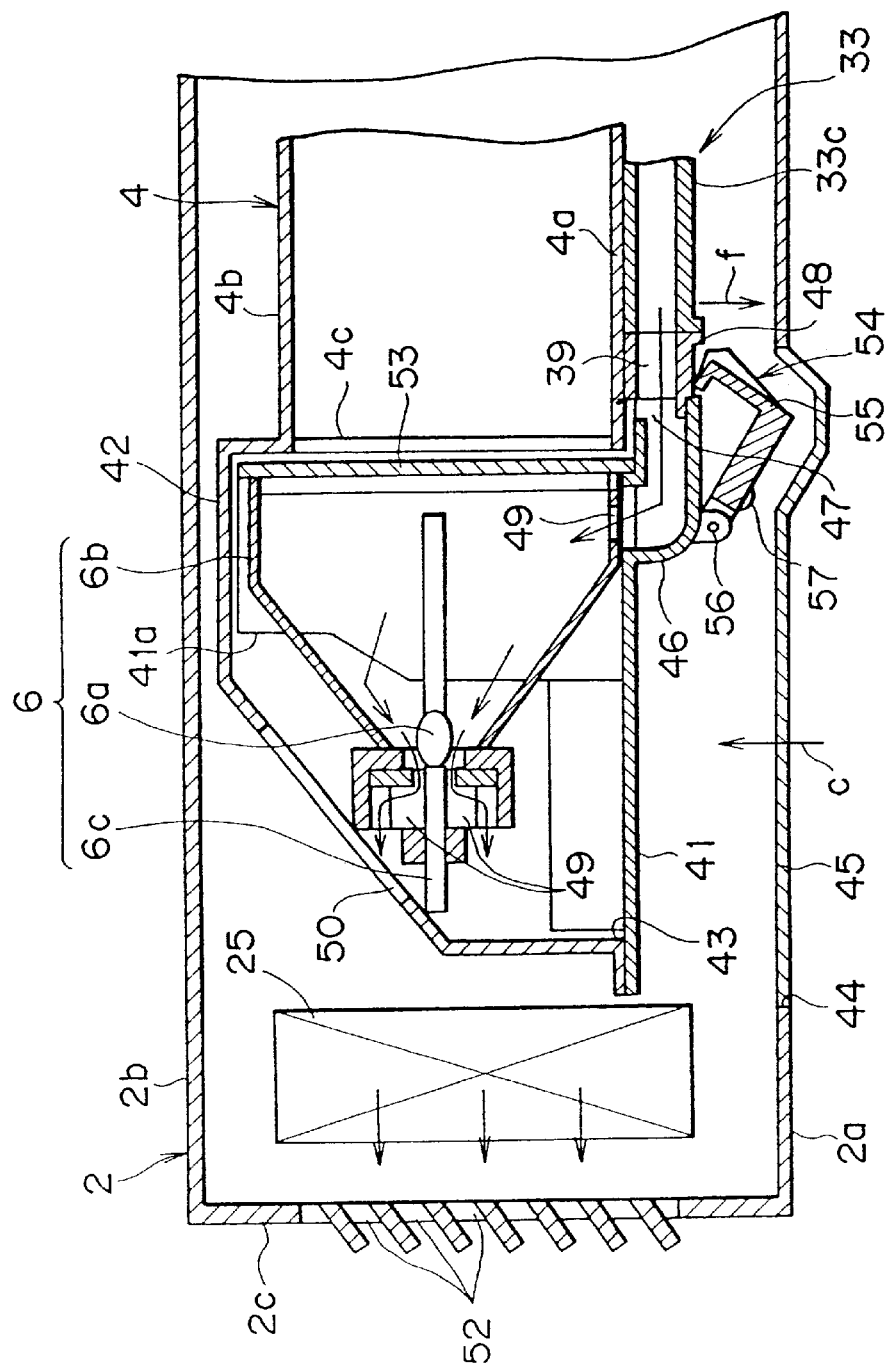
FIG. 7 is a similar view but showing the lamp box of the liquid crystal projector apparatus of FIG. 1 when the lamp box is in a mounted state.
Figure 8:
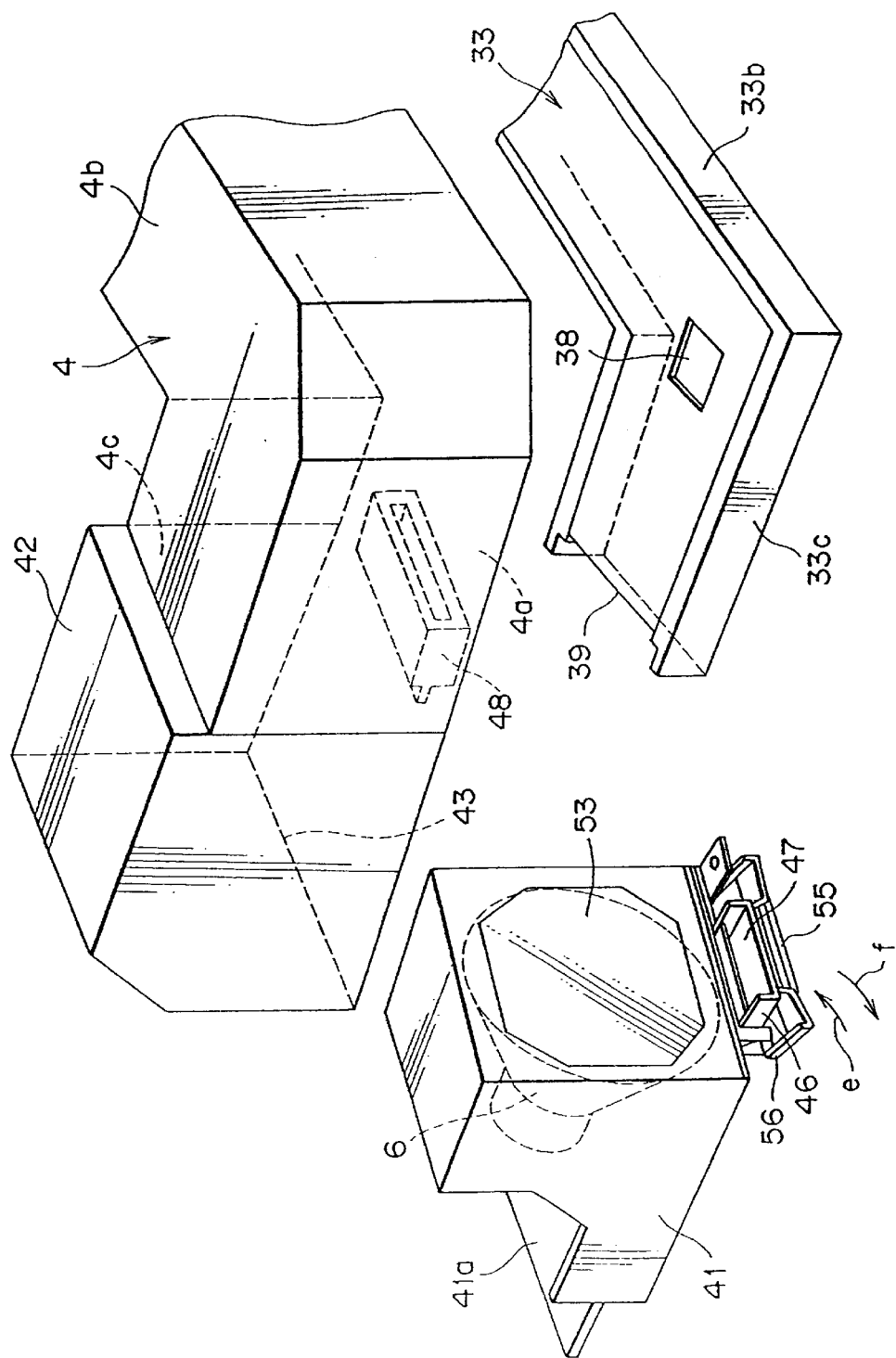
FIG. 8 is an exploded perspective view of a lamp cover of an optical unit, a blasting end portion of an air blasting duct and the lamp box of the liquid crystal projector apparatus of FIG. 1.

Referring now to FIGS. 6 to 8, an extra-high pressure mercury lamp is used for the discharge lamp 6 which serves as a light source, and a lamp valve 6a which is a light emitting element of the discharge lamp 6 is mounted at a central portion of a reflector 6b, which is a reflecting mirror, by means of a base 6c. The discharge lamp 6 is accommodated in the lamp box 41. A lamp cover 42 for positioning the lamp box 41 is mounted in an open end 4c of the optical unit case 4 adjacent the discharge lamp 6, and a lower opening 43 is formed in a lower portion of the lamp cover 42 while another lower opening 44 is formed also in the lower portion 2a of the outer housing 2 at a position just below the lamp cover 42. A removable rear lid 45 is mounted in the lower opening 44 of the outer housing 2. Then, as shown in FIG. 6, in a state wherein the rear lid 45 of the outer housing 2 is removed, the lamp box 41 is removably inserted in the direction of an arrow mark c, which is an upward direction, from below into the lamp cover 42 through the lower openings 44 and 43 until it is mounted in position in the lamp cover 42 as shown in FIG. 7. The lamp box 41 can be removed in the direction of another arrow mark d, which is a downward direction, through the lower openings 43 and 44. After the lamp box 41 is mounted in position, the lower opening 44 is closed up with the rear lid 45. Further, when the lamp box 41 is mounted in the direction of the arrow mark c into or removed in the direction of the arrow mark d from the lamp cover 42, power supply connection terminals (not shown) of the lamp valve 6a of the discharge lamp 6 are connected to or disconnected from power supply connection terminals (not shown) in the lamp cover 42.

The ventilating fan 25 described hereinabove is disposed vertically at a position of a rear face of the lamp cover 42 in the outer housing 2, and a cooling air intake duct 46 having a substantially elbow shape is mounted at an end portion of a lower portion of the lamp box 41 adjacent the air blasting duct 33 such that it extends toward the air blasting duct 33. A cooling air intake port 47 is opened transversely at an end portion of the cooling air intake duct 46, and the cooling air intake port 47 is removably connected to the cooling air delivery port 39 at the terminal end of the air blasting duct 33 by a connecting duct 48. The cooling air intake port 47 is communicated from an opening 49, which is formed at a lower portion of an outer circumferential end of the reflector 6b, with the inside of the reflector 6b, and is communicated with the intake side of the ventilating fan 25 through a plurality of openings 50 formed in an outer peripheral portion of the base 6c of the lamp valve 6a and a plurality of openings 51 formed in the lamp cover 42. A ventilation port 52 is opened to a side face 2c of the outer housing 2 which faces the ventilation side of the ventilating fan 25.

A protective glass plate 53 which covers the front face of the discharge lamp 6 is mounted vertically in a perpendicular relationship to the optical axis P1 on the front face of the lamp box 41. The protective glass plate 53 may be formed in any shape or from any material or may be positioned at any position or held by any method or the like only if it prevents fragments of the discharge lamp 6 from being scattered when the discharge lamp 6 breaks, and may be, for example, an optical element such as a convex lens having a light converging action. Further, the top side, the opposite left and right sides and the rear side of the discharge lamp 6 are open portions and opened by an open portion 41a. Then, if the lamp box 41 is inserted in the direction of the arrow mark c into the lamp cover 42 and mounted in position on the lamp cover 42 as seen in FIG. 7, then the open portion 41a of the lamp box 41 is closed up with the lamp cover 42. An automatic opening/closing mechanism 54 is mounted on the cooling air intake duct 46 at the lower portion of the lamp box 41 for automatically opening and closing the cooling air intake port 47 at and end of the cooling air intake duct 46. The automatic opening/closing mechanism 54 includes a shutter 55 having a substantially L-shaped vertical section and mounted at a lower portion of the cooling air intake duct 46 for pivotal motion in the directions of arrow marks e and f, which are upward and downward directions, by a horizontal fulcrum pin 56. The shutter 55 is biased to pivot in the direction of the arrow mark d, which is a lid closing direction, by a shutter spring 57 serving as pivotal biasing means such as a torsion coil spring.

With the automatic opening/closing mechanism 54, when the lamp box 41 is mounted in position in the direction of the arrow mark c into the lamp cover 42 as seen in FIG. 7, then an end of the shutter 55 is contacted from the direction of the arrow mark c by a lower portion of the connecting duct 48 so that the shutter 55 is yieldably pivoted in the direction of an arrow mark f around the fulcrum pin 56 against the shutter spring 57 to automatically open the cooling air intake port 47. On the other hand, when the lamp box 41 is removed in the direction of the arrow mark c from within the lamp cover 42 as seen in FIG. 6, the shutter 55 is pivoted in the direction of the arrow mark e around the fulcrum pin 56 by the shutter spring 57 so that the shutter 55 automatically closes up the cooling air intake port 47. It is to be noted that the automatic opening/closing mechanism 54 need not necessarily be of the type wherein the shutter 55 is pivoted in the directions of the arrow marks e and f as seen in FIGS. 6 and 7, but another structure wherein, for example, the shutter 55 is slidably moved in the directions of the arrow marks c and d which are upward and downward directions may be adopted alternatively. Further, while the structure wherein the connecting duct 48 formed as a separate member is connected to the air blasting last end portion 33c of the air blasting duct 33 is adopted here, it is otherwise possible to form a portion corresponding to the connecting duct 48 integrally on the air blasting last end portion 33c of the air blasting duct 33 to achieve reduction of the number of parts and the number of assembling steps.

The forced air cooling apparatus 31 is constructed in such a manner as described above. Thus, when the liquid crystal display apparatus 1 is in an operating state wherein a full color image is projected on a screen or the like by a light emitting operation of the discharge lamp 6 of the liquid crystal display apparatus 1 and an optical controlling operation by the optical unit 5, both of the air blasting fan 32 and the ventilating fan 25 are rendered operative to forcibly air-cool the optical unit 5 and the discharge lamp 6 in the optical unit case 4 simultaneously.

In this instance, first by operation of the air blasting fan 32 formed from a sirocco fan which has a high static pressure, cooling air is discharged transversely horizontally from the cooling air discharge port 32b into the cooling air intake port 32a of the air blasting fan 32. Then, the thus discharged cooling air collides with the side face of the air amount adjustment plate 34 in the cooling air intake port 32a and part of the cooling air flows through the gap on the lower side of the air amount adjustment plate 34 to the inclined portion 37 side, and then part of the cooling air is reflected upwardly by 90° by the inclined portion 37 and is blasted vertically upwardly through the three cooling air forwarding ports 22R, 22G and 22B of the optical unit case 4 into the optical unit case 4. Then, another part of the cooling air which has collided with the side face of the air amount adjustment plate 34 is reflected to approximately 45° in a horizontal transverse direction, passes through the air blasting intermediate portion 33b of the air blasting duct 33 and is blasted to the air blasting last end portion 33c side.

Then, the cooling air blasted vertically upwardly from the three cooling air forwarding ports 22R, 22G and 22B into the optical unit case 4 passes at a high speed vertically upwardly along the incoming faces and the outgoing faces of the three spatial optical modulation elements 12R, 12G and 12B and is then discharged into the inside of the outer housing 2 toward the upper portion 2b outside the optical unit case 4 through three cooling air ventilation ports 23R, 23G and 23B of the optical unit case 4. Then, the cooling air forcibly air-cools two dichroic mirrors 10R and 10G and a reflecting mirror 103, the three spatial optical modulation elements 12R, 12G and 12B, the three faces of the cross prism 13, and the three polarizing plates 17R, 17G and 17B and the three polarizing plates 18R, 18G and 18B so that the elements mentioned may be secured to a safe temperature lower than the critical guarantee temperature. Consequently, a seizure, a drop of the light transmittance and so forth of the elements can be prevented.

In this instance, the air amount adjustment plate 34 can adjust the air amount ratio of cooling air to be blasted vertically upwardly from the three cooling air forwarding ports 22R, 22G and 22B into the optical unit case 4 to a value preferable to the cooling air forwarding ports 22R, 22G and 22B such as, for example, 1:2:3. It is to be noted that, if the installation angle of the air amount adjustment plate 34 is finely adjusted in the direction of the arrow mark a by means of the pivot shaft 35, then the air amount ratio of 1:2:3 or the like can be adjusted freely and also the ratio between the blasted air amounts to the three cooling air forwarding ports 22R, 22G and 22B and the blasted air amount to the intermediate air blasting portion 33b of the air blasting duct 33 can be adjusted freely.

Since the air amount adjustment plate is provided in the air blasting duct in this manner, adjustment of the ratio in blasted air amount of cooling air blasted from the air blasting fan to the plurality of optical modulation elements, adjustment of the ratio between the blasted air amount of cooling air to the optical modulation means side and the light source side and so forth can be performed. Consequently, the elements mentioned can be forcibly air-cooled effectively in a high efficiency with individually optimum amounts of cooling air.

Then, the cooling air which is blasted from the air blasting fan 32, branched by the air amount adjustment plate 34 in the air blasting start end portion 33a of the air blasting duct 33 and blasted in a horizontal transverse direction is blasted through the inside of the air blasting intermediate portion 33b to the air blasting last end portion 33c. Then, part of the cooling air is blown upwardly into the optical unit case 4 through the cooling air delivery port 38 of the optical unit case 4 so that the fly eye lens set 7 and the PS conversion element 8 incorporated in the fly eye lens set 7 are forcibly air-cooled with the cooling air. Consequently, the elements mentioned are secured to a safe temperature lower than the heat withstanding use guarantee temperature, and a seizure, a drop of the light transmittance and so forth of the elements can be prevented.

Another part of the cooling air blasted to the air blasting last end portion 33c through the air blasting intermediate portion 33b of the air blasting duct 33 is blasted to the discharge lamp 6 in the lamp box 41 through the cooling air delivery port 39 and the cooling air intake port 47. On the other hand, by operation of the ventilating fan 25, hot air heated to a high temperature around the lamp box 41, the lamp cover 42 and the lamp valve 6a of the discharge lamp 6 and in the reflector 6b is sucked to the outside of the lamp cover 42 through the ports 47, 48 and 49 so that it is forcibly discharged to the outside of the outer housing 2.

Accordingly, since part of cooling air blasted from the air blasting fan 32 passes the air blasting duct 33 and is taken into the inside of the reflector 6b of the discharge lamp 6 in the lamp box 41 through the cooling air intake port 47 while hot air heated to a high temperature around the lamp valve 6a, in the inside of the reflector 6b and in the inside of the lamp box 41 and the lamp cover 42 can be forcibly discharged to the outside of the outer housing 2 by a ventilating action of the ventilating fan 25, a peripheral portion of the lamp valve 6a of the discharge lamp 6 and the inside of the reflector 6b can be forcibly cooled in a high efficiency. Consequently, such a phenomenon that the temperature of the discharge lamp 6 rises to its critical temperature and a devitrification phenomenon (drop of the light transmittance) of the lamp valve 6a can be prevented.

As described above, the forced air cooling apparatus 31 uses two cooling fans of the air blasting fan 32 and the ventilating fan 25 and causes them to operate simultaneously. Then, cooling air blasted from the air blasting fan 32 and having a high static pressure is branched into flows of a vertical upward direction and a horizontal transverse direction in the air blasting start end portion 33a, which is a blasted air branching portion of the air blasting duct 33, such that the three spatial optical modulation elements 12R, 12G and 12B which serve as optical modulation means and the three polarizing plates 17R, 17G and 17B and the three polarizing plates 18R, 18G and 18B are forcibly air-cooled with the cooling air blasted vertically upwardly while the cooling air blasted in the horizontal transverse direction is blasted with a high efficiency through the inside of the air blasting intermediate portion 33b and the air blasting last end portion 33c of the air blasting duct 33 to the PS conversion element 8 and the discharge lamp 6 in a state wherein little drop (pressure loss) of the air amount occurs so that the PS conversion element 8 is forcibly air-cooled while it is blasted. Then, the cooling air blasted by the air blasting duct 33 from the air blasting fan 32 is taken in through the cooling air intake port 47 to the discharge lamp 6 while the discharge lamp 6 is forcibly air-cooled by discharging hot air by a discharging action of the ventilating fan 25.

In this instance, around the three spatial optical modulation elements 12R, 12G and 12B and the three polarizing plates 17R, 17G and 17B and three polarizing plates 18R, 18G and 18B, cooling air blasted from the air blasting fan 32 and having a high static pressure is blasted vertically upwardly from the three cooling air forwarding ports 22R, 22G and 22B of the optical unit case 4 into the inside of the optical unit case 4 and the cooling air is discharged as it is in a high efficiency through the three cooling air ventilation ports 23R, 23G and 23B of the optical unit case 4 vertically upwardly into the inside of the outer housing 2 to forcibly air-cool the three spatial optical modulation elements 12R, 12G and 12B and the three polarizing plates 17R, 17G and 17B and three polarizing plates 18R, 18G and 18B. Consequently, the air amount and the flowing speed of the cooling air can be set to high levels, and the forced air-cooling operations can be performed in a high efficiency. Besides, the cooling air discharged from the three cooling air ventilation ports 23R, 23G and 23B of the optical unit case 4 into the inside of the outer housing 2 toward the upper portion 2b side can be directed to the discharge lamp 6 side and used to discharge hot air.

Meanwhile, the discharge lamp 6 can be forcibly air-cooled in a high efficiency by a synergetic effect of a cooling action provided by taking in cooling air, which has been blasted from the air blasting fan 32 and blasted in a high efficiency through the inside of the air blasting duct 33, from the cooling air intake port 47 and a cooling action of the ventilating fan 25 by discharging hot air. Accordingly, it is possible to lower the speed of rotation of the ventilating fan 25 in use and reduce noise and power consumption and besides achieve augmentation of the long term reliability of the discharge lamp 6.

In particular, when the discharge lamp 6 for which an extra-high pressure mercury lamp or the like is used is used with a high output of 150 W or more, if the temperature of the lamp valve 6a and the inside of the reflector 6b rises to a level higher than their limit temperature, then a devitrification phenomenon (drop of the light transmittance) of the lamp valve 6a occurs. Therefore, the lamp valve 6a and the inside of the reflector 6b must be air-cooled forcibly. In this instance, where a conventional forced air-cooling method which relies only upon a ventilating action of the ventilating fan 25 is used, since the internal resistance against discharging of hot air, it is necessary to use the ventilating fan 25 with a high speed of rotation to obtain a high static pressure for air discharging.

Here, if the output of the discharge lamp 6 is, for example, 200 W, then approximately 20 litter/minute of a static pressure of 2 mmH$_2$O is required as a blasting air amount necessary for forced air-cooling. However, with the forced air cooling apparatus 31 to which the present invention is applied, since cooling air blasted from the air blasting fan 32 through the air blasting duct 33 is taken in through the cooling air intake port 47 to the discharge lamp 6 in the lamp box 41 while hot air around the discharge lamp 6 is discharged to the outside of the outer housing 2 by a ventilating action of the ventilating fan 25, 35 to 50 litter/minute of the static pressure of 4 to 6 mmH$_2$O as a blasted air amount necessary to forcibly air-cool the discharge lamp 6 can be achieved readily. Thus, even if the speed of rotation of the ventilating fan 25 in use is dropped sufficiently, it is possible to stably keep the temperature of and around the lamp valve 6a to its long term guarantee temperature higher than 850° C. but lower than 1,000° C.

Besides, since the forced air cooling apparatus 31 adopts the structure wherein, as shown in FIG. 7, the lamp box 41 which is accommodated is inserted in the arrow mark c from below into and mounted in the lamp cover 42 and the front face side of the discharge lamp 6 is covered with the protective glass plate 53 while the outer periphery and the rear face side (opposite side to the protective glass plate 53) of the discharge lamp 6 are covered with the lamp box 41 and the lamp cover 42, even if the lamp valve 6a of the discharge lamp 6 should break, glass fragments of the lamp valve 6a which are scattered by the break can be confined to the inside of the lamp box 41.

Further, whereas fragments of the lamp valve when it breaks are held in the inside of the lamp box 41 by the protective glass plate 53 and drops to the lower portion of the lamp box 41, since the shutter 55 of the automatic opening/closing mechanism 54 is provided at a position spaced by a greater distance from the discharge lamp 6 as viewed in the outputting direction (horizontal direction) of light from the discharge lamp 6 than the protective glass plate 53 placed at the light output port (vertical plane) of the discharge lamp 6, scattering of the fragments is suppressed to the range to the protective member disposed at the output port of the light source and almost all of the dropping fragments remain within the lamp box. Further, even if the fragments were scattered to the outer side than the shutter 55 of the automatic opening/closing mechanism 54, they could be kept within the air blasting duct 33.

Accordingly, such a situation that the glass fragments are scattered over a wide range in the optical unit case 4 and have a bad influence upon the optical elements 7 to 18 of the optical unit 5 can be prevented, and a high degree of safety can be assured. Further, when the lamp box 41 is to be removed in the direction of the arrow mark d, which is a downward direction, from the lamp cover 42 in order to replace the thus broken lamp valve 6a, the cooling air intake port 47 can be automatically closed up with the shutter 55 of the automatic opening/closing mechanism 54 as shown in FIG. 6, and consequently, such a situation that, during a removing operation of the lamp box 41, the glass fragments scattered in the lamp box 41 drop to the outside from the cooling air intake port 47 and are scattered is prevented. Consequently, the lamp replacement operation can be performed safely and readily.

Further, since the lamp box 41 in which the discharge lamp 6 is accommodated can be removably mounted into the lamp cover 42 integral with the optical unit case 4 so that the optical unit case 4 and the lamp box 41 are formed as a unit which can be removably mounted onto the outer housing 2, when the lamp is to be replaced, the lamp box 41 can be removed downwardly from the lower opening 44 of the outer housing 2 simply and also the optical unit 5 can be removed to the opposite side simply together with the optical unit case 4. Accordingly, assembly, disassembly and so forth of the optical unit 5, the discharge lamp 6 and so forth into and from the outer housing 2 can be performed readily, and the productivity and the maintenance facility of the liquid crystal display apparatus 1 can be augmented remarkably.

It is to be noted that, although the front side of the discharge lamp 6 accommodated in the lamp box 41 is covered particularly with the protective glass plate 53, since the structure wherein the upper side, the opposite left and right sides and the rear side of the discharge lamp 6 of the lamp box 41 are opened by the open portion 41a such that, when the lamp box 41 is inserted in the direction of the arrow mark b from below into and mounted in position in the lamp cover 42 as seen in FIG. 7, the open portion 41a of the lamp box 41 is covered with the lamp cover 42 is adopted, when, in order to replace the lamp, the lamp box 41 is removed in the direction of the arrow mark d, which is a downward direction, from the lower opening 44 of the outer housing 2 as seen in FIG. 6, the open portion 41a of the lamp box 41 can be opened automatically, and the lamp replacement operation can be performed rapidly and readily. It is to be noted that mounting and removal of the lamp box 41 into and from the outer housing 2 may not be performed from the lower side, but be performed from the upper side or from sidewardly through an opening formed in the upper portion or a side portion of the outer housing 2.

Further, in the forced air cooling apparatus 31, since the dust preventive filter 40 is removably mounted at the cooling air intake port 32a of the air blasting fan 32, dust and so forth in cooling air to be taken in through the cooling air intake port 32a by an action of the air blasting fan 32 can be attracted to and removed by the dust preventive filter 40. Accordingly, such a situation that dust and so forth are fed into the optical unit 5 in the optical unit case 4 together with cooling air taken in through the cooling air intake port 32a and stick to the optical elements 7 to 18 in the optical unit 5 to give rise to a drop of the light transmittance or the light reflectance or the like is prevented.

In other words, since the dust protective filter is provided at the cooling air intake port of the air blasting fan, such a disadvantage that dust and so forth are admitted into the optical unit together with cooling air and sticks to the optical elements to reduce the light transmittance or the light reflectance of the optical elements can be prevented, and besides, noise of the air blasting fan can be reduced.

It is to be noted that, since the conventional air blasting fan 21 described hereinabove is formed from an axial flow fan, if the dust preventive filter 40 is mounted at the cooling air intake port 32a, then the blasted air amount drops by approximately 30% due to an increase of the suction resistance to cooling air and also noise increases. However, since the air blasting fan 32 employed in the embodiment of the present invention is formed from a sirocco fan of a multi-blade structure which has a high static pressure, even if the dust preventive filter 40 is mounted at the cooling air intake port 32a, a bad influence of reduction of the blasted air amount of cooling air by an increase of the suction resistance little occurs, and besides, noise is rather reduced by a closing up effect of the cooling air intake port 32a.

While a preferred embodiment of the present invention has been described, such description is for illustrative purposes only, the present invention is not limited to the liquid crystal projector apparatus but can be applied to various display apparatus of the projection type.

While the invention has been described with reference to a specific embodiment chosen for purpose of illustration, it should be apparent that numeral modifications could be made thereto by those skilled in the art without departing from the basic concept and scope of the invention.

What is claimed is:

1. A display apparatus of the projection type, comprising:
   an optical unit including a light source and optical modulation means for modulating light outputted from said light source with an image signal inputted thereto;
   cooling means including an air blasting fan for blasting cooling air blasted from said air blasting fan at least to said light source to cool said light source;
   an outer housing in which said optical unit and said cooling means are incorporated; and
   a lamp box removably mounted in said outer housing and having said light source accommodated therein;
   said lamp box including a transparent protective member disposed adjacent a light output port of said light source, said lamp box having a cooling air intake port for taking in cooling air from said cooling means to said light source, said lamp box further including automatic opening/closing means provided adjacent said cooling air intake port for automatically opening said cooling air intake port when said lamp box is mounted into said outer housing but automatically closing said cooling air intake port when said lamp box is removed to the outside of said outer housing.

2. A display apparatus of the projection type according to claim 1, wherein said cooling air intake port is provided at a lower portion of said lamp box, and said automatic opening/closing means provided adjacent said cooling air intake port is provided at a position spaced by a greater distance from said light source than said protective member in a direction of an optical axis of said light source.

3. A display apparatus of the projection type according to claim 1, wherein said cooling means includes an air blasting duct for blasting cooling air blasted from said air blasting fan at least to said light source to cool said light source, and said cooling air intake port of said lamp box is removably associated with said air blasting duct with said automatic opening/closing means interposed therebetween.

4. A display apparatus of the projection type according to claim 3, wherein said air blasting duct further blasts cooling air to said optical modulation means.

5. A display apparatus of the projection type according to claim 4, wherein said optical unit includes light decomposition means for decomposing light outputted from said light source into color lights of different wavelength bands, a plurality of optical modulation elements which serve as said optical modulation means and upon which the color lights decomposed by said light decomposition means are irradiated, and light synthesis means for synthesizing the color lights modulated by said optical modulation means into image light, and said air blasting duct includes air amount control means for controlling an amount of air to be blasted to said plurality of optical modulation elements.

6. A display apparatus of the projection type according to claim 3, wherein said optical unit includes polarizing conversion means for converting light outputted from said light source into light of a predetermined polarization direction, and said air blasting duct further blasts cooling air to said polarizing conversion means.

7. A display apparatus of the projection type according to claim 3, wherein said air blasting fan is formed from a sirocco fan.

* * * * *